United States Patent [19]

Hicks et al.

[11] Patent Number: 4,478,078
[45] Date of Patent: Oct. 23, 1984

[54] DIRECT GEARLESS DRIVE MECHANISM FOR AN INTERNAL GATE ROTARY VANE FLUID METER

[75] Inventors: Irwin A. Hicks, Radnor; George W. Schneider, Jr., Huntingdon Valley, both of Pa.

[73] Assignee: The Singer Company, Stamford, Conn.

[21] Appl. No.: 491,634

[22] Filed: May 5, 1983

[51] Int. Cl.³ ............................................... G01F 3/08
[52] U.S. Cl. ...................................................... 73/253
[58] Field of Search ................ 73/253, 254, 257, 261; 418/169, 170, 191

[56] References Cited

U.S. PATENT DOCUMENTS

| | | | |
|---|---|---|---|
| 1,994,397 | 3/1935 | Loveridge et al. | 418/169 |
| 2,124,140 | 7/1938 | Foster et al. | 73/261 |
| 3,448,615 | 6/1969 | Schneider, Jr. | 418/169 |
| 3,482,446 | 12/1969 | Wrinkle et al. | 418/169 |
| 3,950,990 | 4/1976 | Butcher | 73/253 |

*Primary Examiner*—Herbert Goldstein
*Attorney, Agent, or Firm*—David L. Davis; Robert E. Smith; Edward L. Bell

[57] ABSTRACT

An internal gate rotary vane fluid meter is provided with a direct gearless drive between the rotor and the gate mounted on parallel displaced shafts inside a housing. A plurality of timing discs mounted on the rotor are utilized for drivingly coupling and synchronizing the gate to the rotor.

4 Claims, 5 Drawing Figures

DIRECT GEARLESS DRIVE MECHANISM FOR AN INTERNAL GATE ROTARY VANE FLUID METER

BACKGROUND OF THE INVENTION

This invention relates to fluid meters and, more particularly, to a fluid meter of the internal gate rotary vane type.

Rotary vane fluid meters with an internal sealing gate are generally well known. Such meters require a timing mechanism between the rotor and the gate to avoid collision, to set the desired rotational velocity of the gate relative to the rotor, and to propel the gate from the rotor. The most commonly used type of timing mechanism is gearing. An example of such a meter using gearing is disclosed in U.S. Pat. No. 3,482,446, which issued on Dec. 9, 1969, to Wrinkle et al. While gear systems such as that disclosed in the Wrinkle et al patent have the advantage of allowing a different rotational velocity between the gate and the rotor in a simple form, such systems also suffer from a number of disadvantages. Gear systems have significant rubbing action, creating friction, which is detrimental to a fluid meter's performance because friction effects accuracy in a variable manner. Such gear systems must also allow some clearance, or backlash, to minimize the friction. This has a detrimental effect in fluid meters due to gear noise. This gear noise can be meshing noise (generally a problem because spur gears are used to reduce friction) or backlash induced noise (because of pressure pulsations from internal and/or external sources). Gear systems also require either self-lubrication (such as plastic) which severely limits gear velocity, or a lubricating oil bath which effects meter accuracy due to oil drag. The most significant problem with gear systems is breakage, which results in catastrophic failure. Accordingly, it is a primary object of this invention to eliminate gearing timing systems in internal gate rotary vane fluid meters.

A major impediment to nqn-geared systems is that most mechanisms that might be candidates have significant velocity limitations due to either imbalance or oscillation characteristics. Thus, for example, the cam drive disclosed in U.S. Pat. No. 226,829, which issued on Apr. 27, 1880, to Bergquest, requires the gate to accellerate/decellerate very rapidly when the rotor vane passes through the gate pocket, thus severely limiting rotational velocity (which limits the meter's capacity) due to torsional vibration and strength of material. Accordingly, it is another object of this invention to provide a direct drive between the rotor and gate which does not have any oscillation or torsional vibration which would limit rotational velocity and thus limit capacity.

Another major impediment to non-geared systems is that the rotational velocity of components within the direct drive mechanisms can be far higher than that of the rotor/gate system which, because of bearing friction, can result in poor accuracy due to friction loads as well as limited capacity due to limiting system rotational velocity for bearing life. For example, the system disclosed in U.S. Pat. No. 3,448,615, which issued on June 10, 1969, to Schneider, Jr., provides various means for the rotor to drive the gate through wheels or rollers which run on cam shaped surfaces on the rotor vanes. Such a device does, or can, have constant velocity of the rotating elements, including the wheels or rollers, but requires the wheels or rollers to operate at a very high rotational velocity, compared to the rotor or gate, thus adding significant bearing friction load as well as limiting capacity in the desire to lower roller or wheel velocity. Accordingly, it is a further object of this invention to provide a direct drive which limits the number of bearings to reduce the friction load which effects meter accuracy. Still another object of this invention is to provide a direct drive which minimizes the rotational velocity of the component bearings to minimize both the friction load and the bearing wear or endurance.

A further impediment to non-geared systems is that direct drive mechanisms can severely limit the capacity per revolution of the meter, requiring either very low capacity in order to keep the rotational velocity down, or very high velocity for acceptable capacity, which results in friction and reduced bearing life. For example, the meter disclosed in U.S. Pat. No. 1,994,397, which issued on Mar. 12, 1935, to Loveridge et al, provides a multiple crank drive consisting of crank discs in the gate. Such a method of direct drive severely limits the meter's capacity or requires very high rotational velocity to achieve acceptable capacity, due to the discs severely limiting the gate pocket size. Such increased velocity results in high bearing friction and reduced bearing life. Accordingly, it is still a further object of this invention to provide a meter drive system having maximum capacity per revolution of the meter to minimize the necessary rotational velocity of all components for reduced bearing friction and longer bearing life.

Yet another object of this invention is to provide a direct gearless drive mechanism for an internal gate rotary vane fluid meter which results in constant rotational velocity of all components, a constant value of torque and inherent balance.

SUMMARY OF THE INVENTION

The foregoing and additional objects are attained in accordance with principles of this invention by providing in an internal gate rotary vane meter, the combination of a rotor adapted to be mounted for rotation about an axis within the meter, the rotor having an end plate and vanes fixed on the rotor end plate, and a pocketed gate adapted to be mounted to rotate within the meter about an axis spaced from the rotor rotational axis, the gate having a periphery provided with pockets therein for reception of the rotor vanes, the number of gate pockets being equal to the number of rotor vanes and the gate having webs extending radially outward between adjacent pockets. A plurality of discs are mounted for rotation on the rotor end plate each in a recess provided therefor, the discs being equally spaced angularly around the center line of the axis of rotation of the rotor at equal radii therefrom and with axes of rotation parallel to the axis of rotation of the rotor. Means are provided for coupling each of the webs to a respective one of the discs at a point remote from the axis of rotation of the disc, the distance between the axis of rotation of each of the discs and the point of coupling to its respective web being equal to the distance between the axis of rotation of the gate and the axis of rotation of the rotor.

In accordance with an aspect of this invention, each of the discs is substantially flush with the surface of the rotor so as to provide a fluid seal.

DESCRIPTION OF THE DRAWINGS

The foregoing will be more readily apparent upon reading the following description in conjunction with the drawings in which like elements shown in different figures thereof have the same reference character applied thereto and wherein.

DETAILED DESCRIPTION

Figure 1:
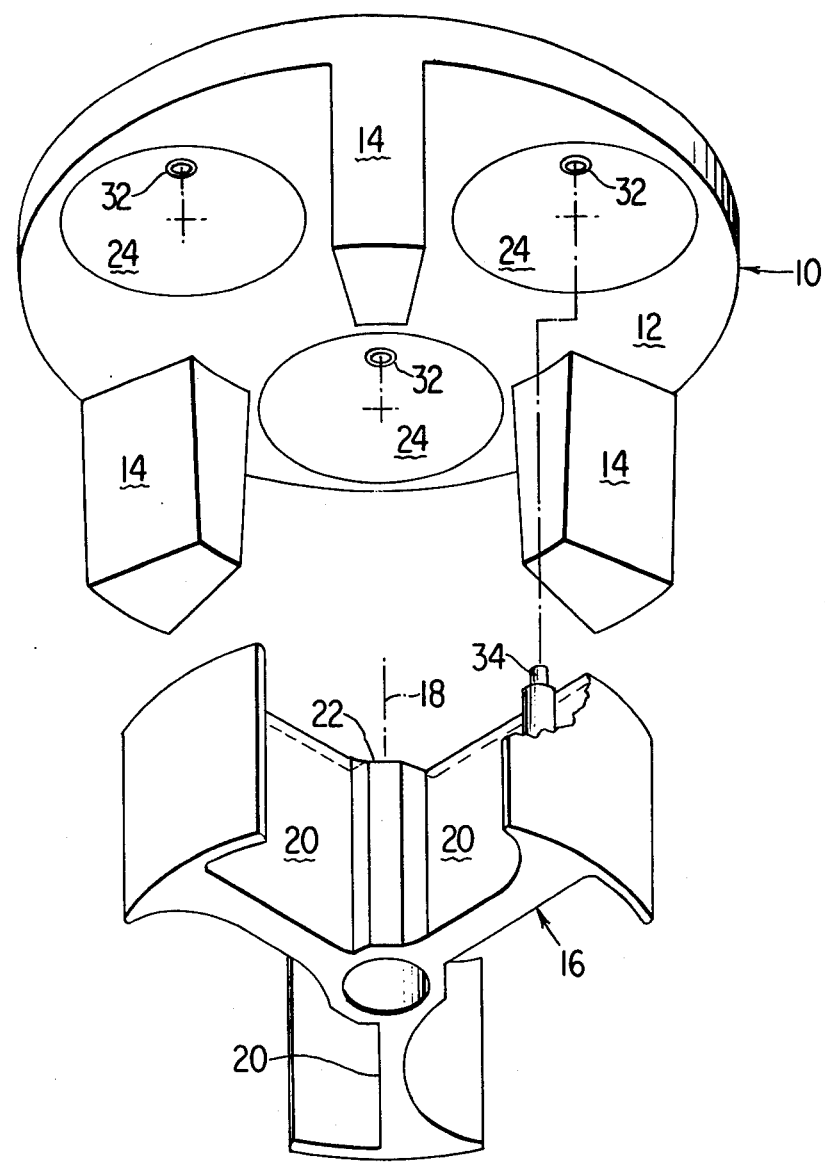
FIG. 1 is an exploded perspective view schematically depicting the rotor, gate and drive mechanism according to this invention.

Referring now to the drawings, shown therein is a rotor/gate assembly and associated drive mechanism constructed in accordance with the principles of this invention. As shown in FIG. 1, the assembly includes a rotor 10 having an end plate 12 and vanes 14 fixed on the end plate 12 and depending therefrom in an axial direction. The rotor 10 is adapted to be mounted for rotation about an axis (not shown) within an internal gate rotary vane fluid meter. The axis of rotation of the rotor 10 is centrally located with respect to the circular end plate 12 and is parallel to the depending direction of the vanes 14.

The assembly shown in FIG. 1 further includes a pocketed gate 16 adapted to be mounted to rotate within the meter about an axis 18. The axis 18 is parallel to, but spaced from, the axis of the rotor 10. The gate 16 has a periphery provided with pockets therein for reception of the rotor vanes 14, the number of gate pockets being equal to the number of rotor vanes 14. The gate 16 is formed with a plurality of webs 20 extending radially outward from a central hub region 22 between adjacent pockets.

Figure 2:
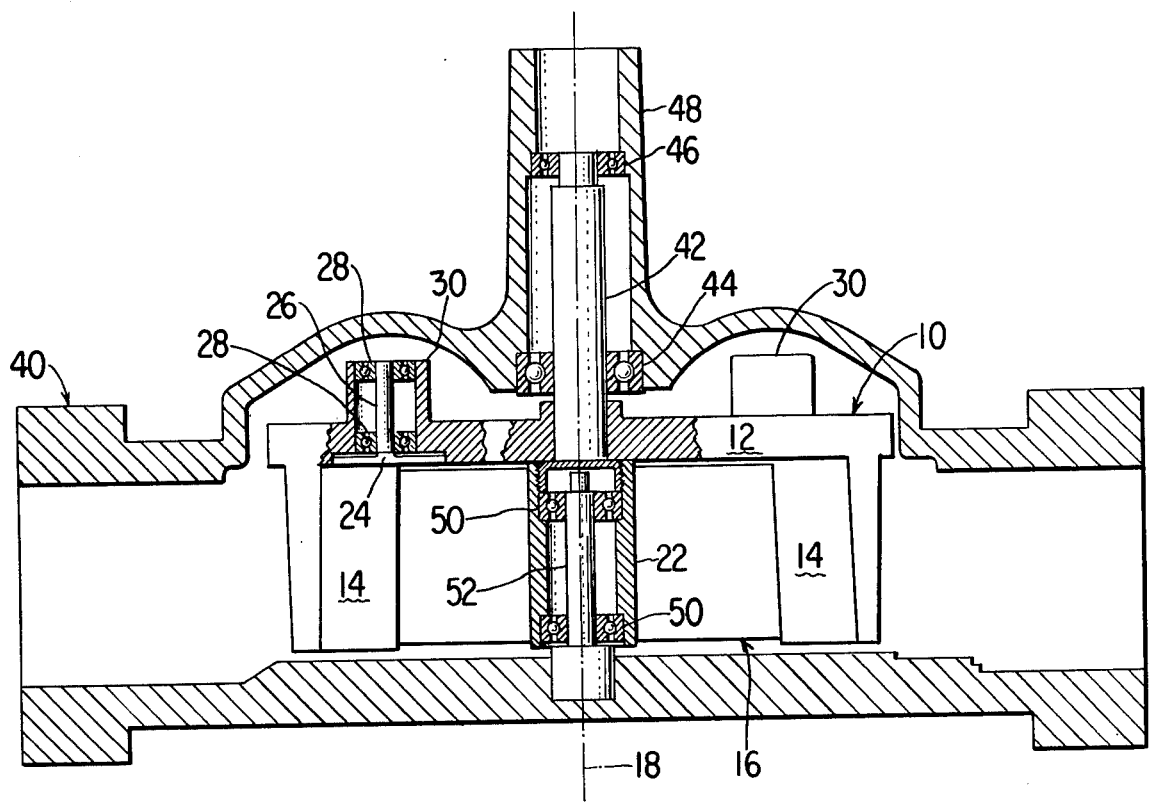
FIG. 2 is a sectional schematic view of a meter incorporating the elements shown in FIG. 1.

The end plate 12 of the rotor 10 is provided with three circular recesses (not shown in FIG. 1), each of which has mounted for rotation therein a timing disc 24. The timing discs 24 are mounted so as to be flush with the surface of the end plate 12, as is more clearly shown in FIG. 2. The flush mounting of the discs 24 in the rotor end plate 12 provides a fluid seal. The discs 24 each have a shaft 26 (FIG. 2) affixed along the center line of the disc 24. The center lines of the discs 24 are spaced 120° apart at the same radial distance around the center line of the rotor 10. As shown in FIG. 2, each of the shafts 26 is mounted with bearings 28 rotatably affixed within a portion 30 of the rotor 10. This arrangement allows each disc 24 to rotate freely about its center line within the enclosure of the rotor 10. Each of the discs 24 has a bushing 32 whose center line is at a precise distance "D" from the center line of the disc, as shown in FIG. 3A.

Also shown in FIG. 1 is one of the three timing pins 34 fixedly attached to the webs 20 of the gate 16. The center lines of the pins 34 are spaced 120° apart at the same radial distance around the gate center line 18 as the radial distance of the center lines of each of the discs 24 are from the center line of the rotor 10. (It is to be noted that the webs 20 can have the bushings 32 and the discs 24 can have the pins 34.) Thus, when the gate timing pins 34 are inserted into the timing disc bushings 32, the gate 16 is free to be positioned with respect to the rotor 10 such that the loci of points of the gate center line 18 is a circle having a radius of "D" but the gate center line 18 is offset from the rotor center line by a distance "D". It will be noted that another characteristic of this arrangement is that the angular relationship of components of the rotor 10 about its center line is identical to the angular relationship of components of the gate 16 at all times. This arrangement provides synchronization of the rotor 10 to the gate 16 at all points of their joint rotation around their respective axes without timing gears, with the lowest possible rotational velocity of all rotating components, with the rotor assembly inherently balanced and with the sum of driving force vectors around the rotor axis resulting in the same total torque value (i.e., constant torque at all angular positions).

Referring now to FIG. 2, shown therein is a sectional schematic view of the rotor 10 and gate 16, as viewed along the line joining the axes of rotation of the rotor 10 and the gate 16, and also showing a sectioned housing 40. As shown in FIG. 2, the rotor 10 is fixedly mounted on a rotor shaft 42 which in turn is mounted in rotor shaft bearings 44 and 46 which are fixed within a tower 48 of the housing 40. This arrangement allows the rotor to freely rotate within the housing 40. As previously described, the timing discs 24 have a shaft 26 allowed to rotate freely within bearings 28 in portion 30 of the rotor 10. As further shown in FIG. 2, the gate 16 is formed with a hollow hub 22 which has bearings 50 affixed therein, the housing 40 having a gate shaft 52 affixed thereto and rotatable secured within the bearings 50. Thus, the gate 16 may freely rotate around the shaft 52.

Figure 3A:
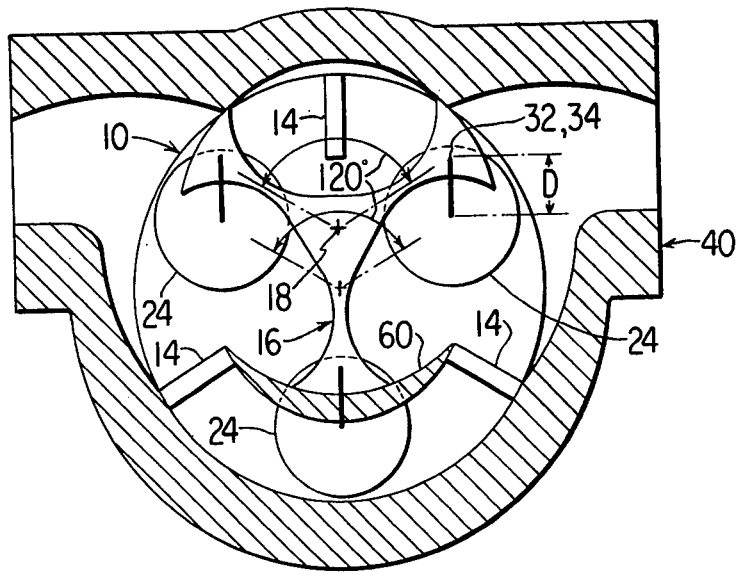
FIGS. 3A, 3B and 3C are each a plan view of a rotor, gate and sectioned housing, showing the synchronized rotor and gate in three positions of a cycle.
Figure 3B:
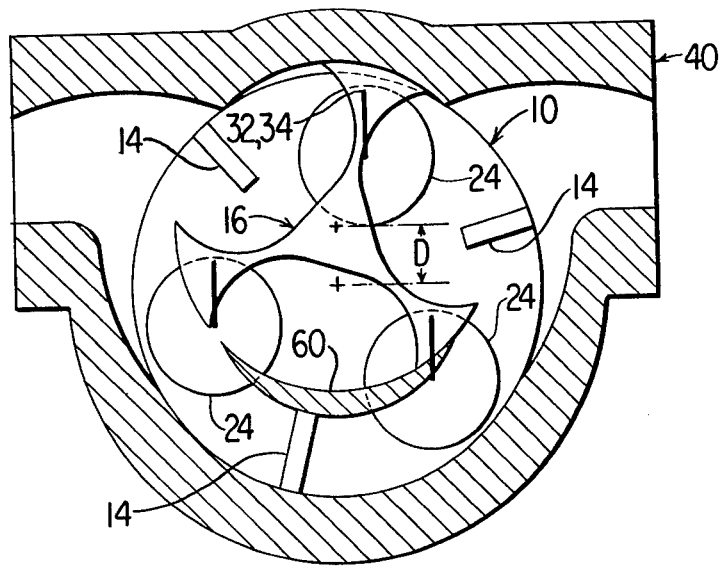
Figure 3C:
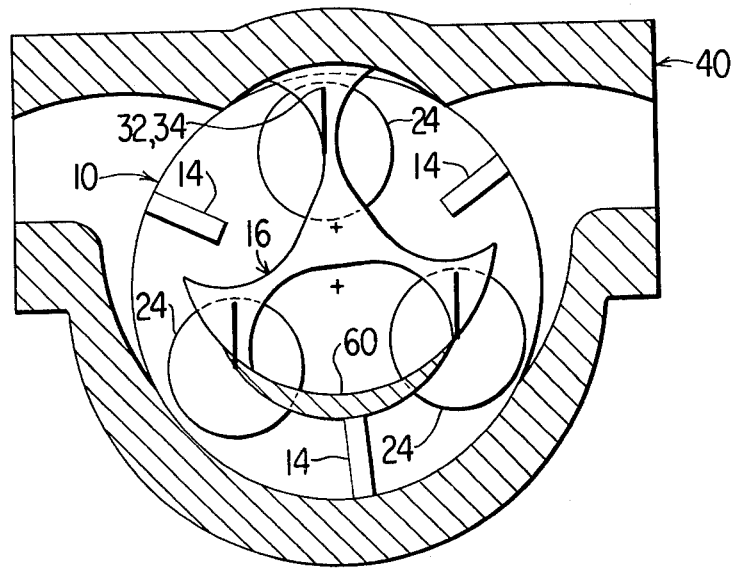

Referring now to FIGS. 3A, 3B and 3C, these show three positions of the rotor 10, the gate 16 and the crank discs 24 in three sequential positions of rotation. In addition to these elements, FIGS. 3A–3C also show a crescent shaped member 60, the function of which is well known in the art of internal gate rotary vane fluid meters. Initially, it is noted that the distance "D" (FIG. 3A) between the center and bushing of each of the timing discs 24 is equal to the distance "D" (FIG. 3B) between the center line of the rotor 10 and the center line of the gate 16. It is further noted that the diameter of the timing discs 24 must be large enough to enclose the pins 34 but small enough to be contained within the diameter of the rotor 10. The angular spacing of the centers of the timing discs 24 on the rotor 10 is 120° and the angular spacing of the pins 34 around the center line 18 of the gate 16 is also 120°. It is not necessary for the rotor vanes 14 to be spaced exactly midway between the timing discs 24 or for the webs 20 of the gate 16 to be centered with respect to the pins 34 so long as the gate 16 and the rotor 10 mesh without interference. On FIGS. 3A–3C, heavy lines have been drawn on the timing discs 24 between the bushings/pins 32/34 and the center of the timing discs 24 so that it can be observed that as the gate 16 and the rotor 10 rotate counterclockwise in unison, the timing discs 24 do not rotate with respect to the housing 40 but rotate clockwise within the rotor 10 around their center lines while simultaneously rotating counterclockwise around the rotor center line. This demonstrates that the rotational velocity of the timing discs 24 equals that of the rotor 10 and the gate 16, that the assemblies are always in balance, that there is no oscillation of components and, therefore, no torsional vibration. Accordingly, there is no rotational velocity limitation which would limit capacity. In fact, this arrangement results in a constant torque applied to the gate 16 by the rotor 10 irrespective of angular position.

It is noted that in accordance with the present invention, there could be constructed an arrangement with other than three timing discs. Two timing discs are required at a minimum and should have their center lines at 90° to each other angularly around the axis of the rotor so as to provide driving torque at all positions of rotation. However, this arrangement can result in imbalance of the rotor assembly due to the unbalanced mass vectors of the timing disc assembly around the rotor assembly center line and also has the disadvantage that the sum of driving force vectors around the rotor center line varies according to the timing disc angular position, varying the gate driving torque. A two timing disc system is thus deemed undesirable. However, any arrangement having three or more timing discs equally positioned angularly around the rotor center line meets the objectives of this invention.

Accordingly, there has been disclosed a direct gearless drive mechanism for an internal gate rotary vane fluid meter. It is understood that the above-described arrangement is merely illustrative of the application of the principles of this invention. Numerous other arrangements may be devised by those skilled in the art without departing from the spirit and scope of this invention, as defined by the appended claims.

We claim:

1. In an internal gate rotary vane fluid meter, the combination of a rotor adapted to be mounted for rotation about an axis within said meter, said rotor having an end plate and a plurality of vanes fixed on the rotor end plate, a pocketed gate adapted to be mounted to rotate within the meter about an axis spaced from said rotor rotational axis, said gate having a periphery provided with a plurality of pockets therein for reception of the rotor vanes, the number of gate pockets being equal to the number of rotor vanes, said gate having a plurality of webs extending radially outward between adjacent pockets, a plurality of discs mounted for rotation on said rotor end plate each in a recess provided therefor, said discs being equally spaced angularly around the center line of the axis of rotation of the rotor at equal radii therefrom and with axes of rotation parallel to the axis of rotation of the rotor, each of said discs having a rotational shaft and said rotor including a plurality of bearing means each adjacent one of said recesses for rotatably receiving respective ones of said disc shafts, each of said discs being substantially flush with the surface of said rotor end plate, and means for coupling each of said webs to a respective one of said discs at a point remote from the axis of rotation of said discs, said coupling means including a bushing in each of said discs and a pin fixedly attached to each of said webs and adapted to rotatably fit within a respective bushing, the distance between the axis of rotation of each of said discs and the point of coupling to its respective web being equal to the distance between the axis of rotation of said gate and the axis of rotation of said rotor.

2. The combination according to claim 1 wherein there are at least three each of the rotor vanes, the gate pockets and the discs.

3. The combination according to claim 2 wherein there are exactly three each of the rotor vanes, the gate webs, and the discs.

4. In an internal gate rotary vane fluid meter, the combination of a rotor adapted to be mounted for rotation about an axis within said meter, said rotor having an end plate and a plurality of vanes fixed on the rotor end plate, a pocketed gate adapted to be mounted to rotate within the meter about an axis spaced from said rotor rotational axis, said gate having a periphery provided with a plurality of pockets therein for reception of the rotor vanes, the number of gate pockets being equal to the number of rotor vanes, said gate having a plurality of webs extending radially outward between adjacent pockets, a plurality of discs mounted for rotation on said rotor end plate each in a recess provided therefor, said discs being equally spaced angularly around the center line of the axis of rotation of the rotor at equal radii therefrom and with axes of rotation parallel to the axis of rotation of the rotor, and means for coupling each of said webs to a respective one of said discs at a point remote from the axis of rotation of said discs, the distance between the axis of rotation of each of said discs and the point of coupling to its respective web being equal to the distance between the axis of rotation of said gate and the axis of rotation of said rotor, wherein said meter includes a housing having a hollow tower portion, bearing means within said tower portion, said rotor includes a rotational shaft adapted to be rotatably secured within said bearing means in said tower portion, said housing further includes a shaft affixed thereto and extending into the interior of said housing from a side opposite said tower portion, said gate includes a hollow hub region, bearing means mounted in said hollow hub region and adapted to rotatably secure said housing shaft therein.

* * * * *